(12) United States Patent
Hassanzadeh

(10) Patent No.: US 9,824,205 B2
(45) Date of Patent: *Nov. 21, 2017

(54) MAPPING PROCESS CHANGES

(71) Applicant: Accenture Global Services Limited, Dublin (IE)

(72) Inventor: Amin Hassanzadeh, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,252

(22) Filed: Dec. 14, 2016

(65) Prior Publication Data

US 2017/0109520 A1   Apr. 20, 2017

Related U.S. Application Data

(63) Continuation of application No. 14/839,238, filed on Aug. 28, 2015, now Pat. No. 9,600,682.

(60) Provisional application No. 62/172,679, filed on Jun. 8, 2015.

(51) Int. Cl.
*G06F 21/00* (2013.01)
*G06F 21/44* (2013.01)
*G06F 21/60* (2013.01)
*G06F 21/62* (2013.01)

(52) U.S. Cl.
CPC ............ *G06F 21/44* (2013.01); *G06F 21/604* (2013.01); *G06F 21/6218* (2013.01)

(58) Field of Classification Search
CPC ..... G06F 21/44; G06F 21/6218; G06F 21/604
See application file for complete search history.

(56) References Cited

U.S. PATENT DOCUMENTS

| | | | | |
|---|---|---|---|---|
| 5,603,031 | A * | 2/1997 | White | G06F 9/465 719/317 |
| 6,338,141 | B1 * | 1/2002 | Wells | G06F 21/56 714/28 |
| 6,684,244 | B1 * | 1/2004 | Goldman | H04L 41/0893 370/395.21 |
| 6,754,885 | B1 * | 6/2004 | Dardinski | G05B 15/02 717/113 |
| 6,836,894 | B1 * | 12/2004 | Hellerstein | G06F 11/323 345/619 |

(Continued)

*Primary Examiner* — David García Cervetti
(74) *Attorney, Agent, or Firm* — Fish & Richardson P.C.

(57) ABSTRACT

In one implementation, a computer-implemented method includes receiving a request to run a particular process; determining whether the particular process is to be run in isolation on the computer system; selecting a particular permission scheme from among a plurality of permission schemes based, at least in part, on one or more characteristics of the particular process; fetching, according to the particular permission scheme, a copy object that corresponds to an actual object for the particular process, wherein the copy object is instantiated in an isolated environment; running the particular process is isolation on the computer system by executing the copy object in the isolated environment; applying, according to the particular permission scheme, one or more changes to the copy object; and mapping, according to the particular permission scheme, the one or more changes in the copy object to the actual object.

18 Claims, 6 Drawing Sheets

(56) References Cited

U.S. PATENT DOCUMENTS

| | | | | |
|---|---|---|---|---|
| 7,089,530 B1* | 8/2006 | Dardinski | | G05B 15/02 |
| | | | | 700/83 |
| 7,096,465 B1* | 8/2006 | Dardinski | | G05B 19/0426 |
| | | | | 717/121 |
| 7,272,815 B1* | 9/2007 | Eldridge | | G06F 8/71 |
| | | | | 707/999.009 |
| 7,461,144 B1* | 12/2008 | Beloussov | | G06F 9/5055 |
| | | | | 707/999.202 |
| 7,619,979 B2* | 11/2009 | Phelan | | H04L 41/0659 |
| | | | | 370/242 |
| 7,647,633 B2* | 1/2010 | Edery | | G06F 21/52 |
| | | | | 726/22 |
| 8,042,120 B2 | 10/2011 | Laborczfalvi | | G06F 9/468 |
| | | | | 709/218 |
| 8,079,086 B1* | 12/2011 | Edery | | G06F 21/52 |
| | | | | 713/175 |
| 8,095,940 B2* | 1/2012 | Bissett | | G06F 9/4428 |
| | | | | 717/120 |
| 8,117,559 B2* | 2/2012 | Laborczfalvi | | G06F 9/4443 |
| | | | | 715/781 |
| 8,171,479 B2* | 5/2012 | Laborczfalvi | | G06F 8/61 |
| | | | | 713/165 |
| 8,180,893 B1* | 5/2012 | Spertus | | G06F 21/52 |
| | | | | 709/200 |
| 8,234,640 B1* | 7/2012 | Fitzgerald | | G06F 21/53 |
| | | | | 718/1 |
| 8,326,872 B2* | 12/2012 | Zwilling | | G06F 17/30557 |
| | | | | 707/783 |
| 8,429,429 B1* | 4/2013 | Kargman | | G06F 21/53 |
| | | | | 711/152 |
| 8,499,350 B1* | 7/2013 | Satish | | G06F 21/566 |
| | | | | 726/23 |
| 8,612,971 B1* | 12/2013 | Fitzgerald | | G06F 9/45533 |
| | | | | 718/1 |
| 8,775,802 B1* | 7/2014 | Kargman | | G06F 21/53 |
| | | | | 713/166 |
| 8,949,825 B1* | 2/2015 | Fitzgerald | | G06F 9/45537 |
| | | | | 718/1 |
| 9,027,078 B1* | 5/2015 | Manmohan | | G06F 21/53 |
| | | | | 726/1 |
| 9,086,917 B1* | 7/2015 | Fitzgerald | | G06F 8/60 |
| 9,111,089 B1* | 8/2015 | Bhatia | | G06F 21/00 |
| 9,223,972 B1* | 12/2015 | Vincent | | G06F 21/566 |
| 9,294,492 B1* | 3/2016 | Martini | | H04L 63/1416 |
| 2002/0013910 A1* | 1/2002 | Edery | | G06F 21/52 |
| | | | | 726/24 |
| 2003/0088604 A1 | 5/2003 | Kuck et al. | | |
| 2004/0025016 A1* | 2/2004 | Focke | | G06F 9/45537 |
| | | | | 713/164 |
| 2004/0111578 A1* | 6/2004 | Goodman | | G06F 21/53 |
| | | | | 711/163 |
| 2004/0205203 A1* | 10/2004 | Peinado | | G06F 12/1425 |
| | | | | 709/229 |
| 2004/0225674 A1* | 11/2004 | Benson | | G06F 17/30507 |
| 2005/0010934 A1 | 1/2005 | Sanouillet | | |
| 2005/0149726 A1* | 7/2005 | Joshi | | G06F 21/51 |
| | | | | 713/164 |
| 2005/0182739 A1* | 8/2005 | Dasu | | G06Q 10/00 |
| | | | | 706/47 |
| 2006/0069692 A1* | 3/2006 | Pernia | | G06F 21/53 |
| 2006/0070030 A1* | 3/2006 | Laborczfalvi | | G06F 9/52 |
| | | | | 717/120 |
| 2006/0074989 A1* | 4/2006 | Laborczfalvi | | G06F 9/443 |
| 2006/0075381 A1* | 4/2006 | Laborczfalvi | | G06F 9/468 |
| | | | | 717/100 |
| 2006/0085789 A1* | 4/2006 | Laborczfalvi | | G06F 9/468 |
| | | | | 718/100 |
| 2006/0143536 A1* | 6/2006 | Grey | | G06F 11/3688 |
| | | | | 714/38.14 |
| 2006/0174078 A1* | 8/2006 | Robison | | G06F 9/468 |
| | | | | 711/163 |
| 2006/0206866 A1* | 9/2006 | Eldrige | | G05B 15/02 |
| | | | | 717/122 |
| 2007/0083655 A1* | 4/2007 | Pedersen | | H04L 63/102 |
| | | | | 709/226 |
| 2007/0118902 A1 | 5/2007 | Focke et al. | | |
| 2008/0127292 A1* | 5/2008 | Cooper | | G06F 21/53 |
| | | | | 726/1 |
| 2008/0134175 A1* | 6/2008 | Fitzgerald | | G06F 9/45533 |
| | | | | 718/1 |
| 2008/0134176 A1* | 6/2008 | Fitzgerald | | G06F 9/45537 |
| | | | | 718/1 |
| 2008/0134177 A1* | 6/2008 | Fitzgerald | | G06F 21/51 |
| | | | | 718/1 |
| 2008/0134178 A1* | 6/2008 | Fitzgerald | | G06F 9/45537 |
| | | | | 718/1 |
| 2008/0141266 A1 | 6/2008 | Hunt et al. | | |
| 2008/0184225 A1* | 7/2008 | Fitzgerald | | G06F 9/455 |
| | | | | 718/1 |
| 2008/0301765 A1* | 12/2008 | Nicol | | H04L 41/142 |
| | | | | 726/1 |
| 2009/0106780 A1* | 4/2009 | Nord | | G06F 9/5077 |
| | | | | 719/329 |
| 2009/0182811 A1* | 7/2009 | Sugawara | | G06F 17/3015 |
| | | | | 709/204 |
| 2009/0205018 A1* | 8/2009 | Ferraiolo | | G06F 21/6218 |
| | | | | 726/1 |
| 2010/0005531 A1* | 1/2010 | Largman | | G06F 21/53 |
| | | | | 726/24 |
| 2010/0023951 A1* | 1/2010 | Violleau | | G06F 9/468 |
| | | | | 719/315 |
| 2010/0146340 A1* | 6/2010 | Bhate | | G06F 11/3676 |
| | | | | 714/38.14 |
| 2010/0162049 A1* | 6/2010 | Stall | | G06F 11/3644 |
| | | | | 714/38.14 |
| 2010/0205014 A1* | 8/2010 | Sholer | | G06Q 40/08 |
| | | | | 705/4 |
| 2010/0218261 A1* | 8/2010 | Schneider | | G06F 21/54 |
| | | | | 726/27 |
| 2010/0223613 A1* | 9/2010 | Schneider | | G06F 9/45558 |
| | | | | 718/1 |
| 2010/0262694 A1* | 10/2010 | Havemose | | G06F 8/61 |
| | | | | 709/226 |
| 2010/0262970 A1* | 10/2010 | Havemose | | G06F 8/62 |
| | | | | 718/104 |
| 2010/0262977 A1* | 10/2010 | Havemose | | G06F 9/545 |
| | | | | 719/310 |
| 2010/0281102 A1* | 11/2010 | Chinta | | G06F 21/53 |
| | | | | 709/203 |
| 2010/0281537 A1* | 11/2010 | Wang | | G06F 9/468 |
| | | | | 726/22 |
| 2011/0047613 A1* | 2/2011 | Walsh | | G06F 21/53 |
| | | | | 726/16 |
| 2011/0099609 A1* | 4/2011 | Malhotra | | G06F 21/53 |
| | | | | 726/4 |
| 2011/0145926 A1* | 6/2011 | Dalcher | | G06F 11/3466 |
| | | | | 726/26 |
| 2011/0154431 A1* | 6/2011 | Walsh | | G06F 21/53 |
| | | | | 726/1 |
| 2011/0225649 A1* | 9/2011 | Bhogal | | G06F 21/53 |
| | | | | 726/22 |
| 2011/0238630 A1* | 9/2011 | Nishigaki | | G06F 17/30368 |
| | | | | 707/679 |
| 2011/0289308 A1* | 11/2011 | Sobko | | G06F 21/56 |
| | | | | 713/100 |
| 2011/0296487 A1* | 12/2011 | Walsh | | G06F 21/10 |
| | | | | 726/1 |
| 2012/0158931 A1* | 6/2012 | Ohlman | | G06Q 10/101 |
| | | | | 709/223 |
| 2012/0216285 A1* | 8/2012 | Walsh | | G06F 21/53 |
| | | | | 726/26 |
| 2013/0024929 A1* | 1/2013 | Abraham | | G06F 21/53 |
| | | | | 726/16 |
| 2013/0086623 A1* | 4/2013 | Walsh | | G06F 21/6218 |
| | | | | 726/1 |
| 2013/0138810 A1* | 5/2013 | Binyamin | | H04L 41/50 |
| | | | | 709/225 |

(56) References Cited

U.S. PATENT DOCUMENTS

| | | | |
|---|---|---|---|
| 2013/0145463 A1* | 6/2013 | Ghosh | G06F 21/56 726/22 |
| 2013/0227568 A1 | 8/2013 | Anderson | |
| 2013/0227641 A1* | 8/2013 | White | H04L 63/20 726/1 |
| 2013/0246513 A1* | 9/2013 | Zaveri | G06F 3/067 709/203 |
| 2013/0246932 A1* | 9/2013 | Zaveri | G06F 3/017 715/740 |
| 2014/0040897 A1* | 2/2014 | Davis | G06F 11/3636 718/100 |
| 2014/0053057 A1* | 2/2014 | Reshadi | G06F 17/2247 715/234 |
| 2014/0053266 A1* | 2/2014 | Wang | G06F 21/50 726/22 |
| 2015/0058987 A1* | 2/2015 | Thure | G06F 21/554 726/23 |
| 2015/0242227 A1* | 8/2015 | Nair | G06F 21/60 718/1 |
| 2015/0242622 A1* | 8/2015 | Xu | G06F 21/53 726/1 |
| 2015/0288720 A1* | 10/2015 | Touboul | G06F 21/51 726/1 |
| 2015/0302184 A1* | 10/2015 | Kargman | G06F 21/126 726/22 |
| 2015/0324146 A1* | 11/2015 | Xiao | G06F 21/53 711/112 |
| 2015/0347617 A1* | 12/2015 | Weinig | G06F 21/53 715/234 |
| 2016/0034191 A1* | 2/2016 | Kinoshita | G06F 3/061 711/103 |
| 2016/0048844 A1* | 2/2016 | Vogt, Jr. | G06Q 30/018 705/317 |

* cited by examiner

MAPPING PROCESS CHANGES

CROSS-REFERENCE TO RELATED APPLICATION

This application is a continuation (and claims the benefit of priority under 35 USC 120) of U.S. application Ser. No. 14/839,238, filed Aug. 28, 2015, which claims the benefit of U.S. Provisional Application No. 62/172,679, filed Jun. 8, 2015, and titled "Mapping Process Changes." Both of these prior applications are incorporated by reference in their entirety.

TECHNICAL FIELD

This document generally describes technology related to mapping process changes on computer systems.

BACKGROUND

Computer applications (e.g., web browser applications, browser-based applications, thin client applications, stand-alone applications) that are run on computing devices (e.g., laptop computers, desktop computers, mobile computing devices, computer systems) by one or more processors can include any number of computer processes that are executed by the one or more processors to provide the applications. For example, a web browser application may include separate processes that are executed and communicate with each other to retrieve, render, and output web pages, such as web pages that use one or more browser plugins.

Computer processes that are executed on a computer may pose security risks, such as the processes making unwanted changes on the computer (e.g., permission changes, data corruption, network settings modifications) and/or unauthorized accessing of sensitive information (e.g., private user information, financial information). A variety of security mechanisms have been used to minimize the potentially negative effects of such computer processes, such as sandboxing processes (running processes in isolated environment), running processes on virtual machines (emulation of a computing environment), using antivirus software, implementing various network firewalls, using encryption for stored information, and using certificates to authenticate permission of various operations.

SUMMARY

This document generally describes applying and/or mapping changes from processes being executed in isolation to the actual underlying processes (and associated data, such as objects for the processes) based on a variety of different permission schemes. Permission schemes can be selected based on one or more attributes associated with processes, such as characteristics of the processes. For example, a proactive permission scheme can be used to obtain user permission for changes to be mapped from an isolated process back to the actual process in advance of any changes being received when the copy of the process is running in isolation. In another example, a reactive permission scheme can be used to obtain user permission for each change as it is to be mapped from an isolated process back to the actual process. In a further example, reactive permission schemes can additionally and/or alternatively group (batch) similar changes (e.g., write( ) command) and apply them together once a single user permission has been received for applying the changes in the group/batch.

In one implementation, a computer-implemented method includes receiving, at a process manager running on a computer system, a request to run a particular process on the computer system; determining, by the process manager, whether the particular process is to be run in isolation on the computer system; selecting, by the process manager and in response to determining that the particular process is to be run in isolation, a particular permission scheme from among a plurality of permission schemes based, at least in part, on one or more characteristics of the particular process, wherein each of the plurality of permission schemes defines a different set of permission requirements for applying changes to a process being run in isolation; fetching, by the process manager and according to the particular permission scheme, a copy object that corresponds to an actual object for the particular process, wherein the copy object is instantiated in an isolated environment on the computer system; running the particular process is isolation on the computer system by executing the copy object in the isolated environment; applying, by the process manager and according to the particular permission scheme, one or more changes to the copy object; and mapping, by the process manager and according to the particular permission scheme, the one or more changes in the copy object to the actual object.

Such a computer-implemented method can optionally include one or more of the following features. The plurality of permission schemes can include, at least, (i) a proactive permission scheme in which user permission is obtained in advance of all changes being received for the copy object, and (ii) a reactive permission scheme in which user permission is obtained in response to each change that is received for the copy object, and (iii) a reactive batching permission scheme in which user permission is obtained in response to a batched group of changes that are received for the copy object. The particular permission scheme can include the proactive permission scheme. The computer-implemented method can further include outputting, by the computer system and before fetching the copy object, information to prompt a user to provide permission for changes to the copy object in advance of any changes being made; and receiving, at the computer system and before fetching the copy object, user input comprising permission for changes to the copy object. The copy object can be fetched in response to the user input being received. The particular permission scheme can include the reactive permission scheme. The computer-implemented method can further include outputting, by the computer system after fetching the copy object and before applying the one or more changes to the copy object, information to prompt a user to provide permission for each of the one or more changes to the copy object; and receiving, at the computer system and before applying the one or more changes to the copy object, user input comprising permission for each of the one or more changes to the copy object. The one or more changes cam be applied to the copy object in response to the user input being received. The computer-implemented method can further include outputting, by the computer system after applying the one or more changes to the copy object and before mapping the one or more changes to the actual object, information to prompt a user to provide permission for each of the one or more changes to the copy object; and receiving, at the computer system and before mapping the one or more changes to the actual object, user input comprising permission for each of the one or more changes to the copy object. The one or more changes can be mapped to the copy object in response to the user input being received.

Such a computer-implemented method can further include obtaining, by the process manager, an indication that another version of the actual object is running as part of another process on the computer system. The one or more changes to the copy object can be mapped to the actual object in response to obtaining the indication. Such a computer-implemented method can further include determining a likelihood that the copy object will require multiple mappings to the actual object within a threshold period of time; selecting a particular isolated storage scheme from among a plurality of isolated storage schemes based, at least in part, on the likelihood that the copy object will required multiple mappings within the threshold period of time; and storing the copy object and the one or more changes in the isolated environment according to the particular isolated storage scheme. The plurality of isolated storage schemes can include, at least, (i) a first isolated storage scheme in which the copy object and the one or more changes are stored in an isolated space in non-volatile memory, and (ii) a second isolates storage scheme in which the copy object and the one or more changes are stored in an isolated space in volatile memory. The particular isolated storage scheme can include the first isolated storage scheme when the copy object is determined to have less than a threshold likelihood of requiring multiple mappings within the threshold period of time. The copy object and the one or more changes can be stored in the isolated space in non-volatile memory until being mapped to the actual object.

The particular isolated storage scheme can include the second isolated storage scheme when the copy object is determined to have at least a threshold likelihood of requiring multiple mappings within the threshold period of time. The copy object and the one or more changes can be stored in the isolated space in volatile memory until being mapped to the actual object. The computer-implemented method can include determining whether one or more limits on storage in the isolated space in volatile memory has been reached. The copy object and the one or more changes can be flushed from the isolated space in volatile memory and mapped to the actual object in response to determining that the one or more limits have been reached. The one or more limits can include an upper limit on a number of objects stored in the isolated space in volatile memory. The one or more limits can include an upper limit on a number of isolated processes working on the copy object. The one or more limits can include an upper limit on a number of changes applied to the copy object while in the isolated space in volatile memory. The one or more limits can include an upper limit on a length of time that the copy object is permitted to be stored in the isolated space in volatile memory before being mapped to the actual object. The volatile memory can be main memory for the computer system. The non-volatile memory can be one or more storage devices for the computer system.

Certain implementations may provide one or more advantages. For example, user convenience can be appropriately balanced against security risks that may be posed from applying changes from processes running in isolation. A proactive permission scheme can provide greater usability by obtaining user permission in advance of any changes, which allows all changes applied to the process to be mapped back to the actual process without subsequent user input. However, such a scheme may pose a greater security risk on the computer system by not asking the user for permission for each individual change that may take place, as done with a reactive permission scheme that is less convenient for a user (e.g., prompting the user for permission for each change). By applying different permission schemes to different isolated processes based on the security risk that they pose, a balance between user convenience and security on the computer system can be maximized (e.g., allowing less risky processes to make changes under a proactive permission scheme and restricting changes from more risky processes to a reactive permission scheme).

In another example, grouping (batching) similar changes in a reactive scheme can reduce the number of times that user is asked to provide permission while still permitting the system to operate in a reactive mode of operation. For instance, if there is a write( ) command applying multiple changes to a file/memory, an isolation process can wait until all of changes are performed and then ask for user permission to apply all of the changes together instead after asking the user for every single write. Such grouping mechanism can be applied in a variety of different contexts, such as with regard to security-sensitive tasks that access sensitive information (e.g., private user information, financial information). Batch reactive approaches can be more convenient than pure reactive approach in that it can reduce the number of times a user is asked to provide permission. Batch reactive schemes may, however, still pose risks since some changes in a batch may be different than others in terms of security level. Such risks can be minimized by, for example, by ensuring that changes are batched/grouped so that actions in a batch/group impose the same risk level to the system.

In a further example, grouping (batching) similar changes for user permission can allow a user to have a more complete picture of the spectrum of changes that will be applied, and to make a more informed decision regarding whether to approve the changes. For instance, since most processes create child processes that have the same access policy, required objects, and the same read/write sequences, sets of parent and child processes in an execution state are likely to apply changes to the objects at the same time (or very small delta time). By grouping together such changes, which are likely to impact the same objects, a user can make a more informed and efficient decision regarding whether to apply changes as opposed to approving each change individually, which may not provide an overview of the collective changes that are being applied.

In another example, grouping (batching) similar changes for user permission can also improve memory and CPU performance. For instance, minimizing the number of times that a CPU interacts with memory (non-volatile memory, volatile memory, main memory) can improve a computing device's performance, particularly for machines with slow I/O devices. If multiple processes are requesting that similar changes (or any other similarity in terms of type of change, children processes of one parent process, similar objects, location of copy object, etc.) be applied, it can be more efficient to group them together and save time and resources for those actions.

In a further example, proactive mechanisms can be selected to provide greater resource efficiency (e.g., memory usage, CPU usage) than reactive mechanisms based on proactive mechanisms being able to be implemented without context switch overhead to stop a kernel level task and calling user level tasks to prompt a user and to receive his/her permission, as done with a reactive mechanism. For instance, whenever a processor suspends a task in order to apply changes, such as to receive reactive user input, there can be resource-demanding context switch procedures in the system. Proactive mechanisms can provide greater efficiency versus reactive mechanisms since there is no additional task scheduling/context switch/etc. caused by proactive mechanisms, whereas reactive mechanisms can use such additional task scheduling/context switches/etc., which are inefficient operations during a monotonous process execution period. Such context-switching overhead can directly affect system performance and memory/CPU utilization. For instance, if the number of copy processes that are in an execution state increases, which can likely increase the amount of time that the system needs to switch between them, then the system performance can degrade.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
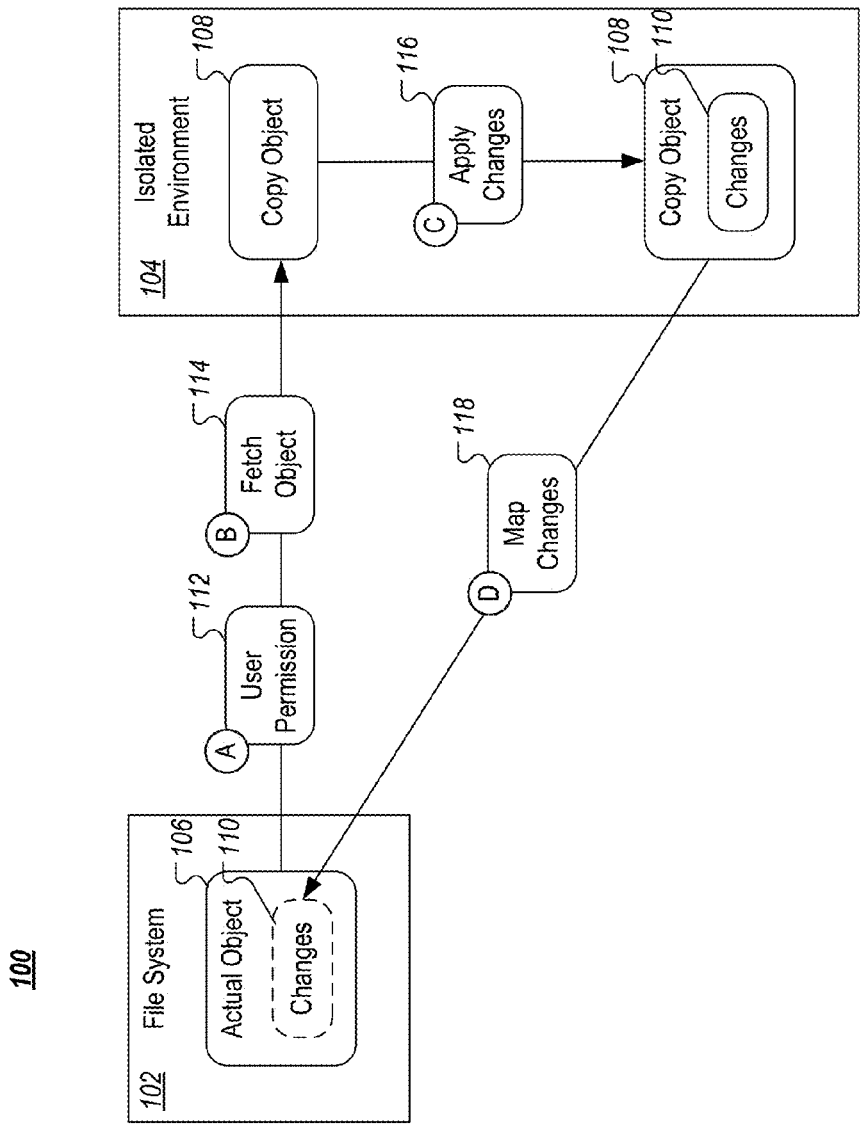
FIGS. 1A-B are a conceptual diagram of an example computer system for applying and mapping process changes according to various permission schemes.

This document generally describes techniques, systems, program products, and computing devices for applying and mapping changes from isolated processes to actual system resources (e.g., files, network settings, registry entries, etc.) based on one or more selected permission schemes for the isolated processes. For example, mapping procedures for copy versions of critical resources to the actual versions may be implemented in different ways. User confirmation/permission for mapping such changes may be needed depending on, for example, the importance level of the object (e.g., user or system files, etc.) and/or number of attempts to make changes to the object. For instance, if the isolated process is changing a system file in order to modify some I/O configurations (e.g., turn BLUETOOTH or webcam ON/OFF), it may be necessary to ask for user permission immediately to make such changes; however, making some changes in user files (e.g., text documents) may not need user permission until the changes are going to be mapped to the actual files.

There can be trade-offs between security (e.g., restricting/allowing changes to be applied) and convenience (e.g., requesting user permission for changes). For example, if an isolated process is expected to make multiple changes in several critical system files, it may not be user friendly to ask for user permission for every single mapping that the system performs to the copy object. On the other hand, not asking for such permissions for mappings may pose a security risk and be hazardous to the system. In addition to the number of user permissions required for mapping a copy object to the actual object in the system, which can be a function of critical changes an isolated process may apply to the copy object, the number of times that an isolated process is called (the process itself and/or its children) during system operation time can directly affect the mapping complexity and overhead. In order to maximize the trade-off between security and convenience of the system, different permission schemes can be selected for isolated processed.

For example, to better balance between the number of mappings needed for isolated objects/processes and the number of changes mapped to the actual objects, different permission schemes may be applied based on, for example, the characteristics of the objects (e.g., likelihood that the objects will change system files vs. user files, number of changes expected). For instance, proactive permission schemes can be used that force users to provide permission whenever an isolated process needs access to an object and a copy of it is going to be provided (e.g., fetch a copy of the actual object). In such a case, irrespective to the operations on the object (e.g., read or write) that the isolated process would perform, the permission for mapping is asked at the fetch time when the first copy of the object is created. This can allow the isolated process to apply any changes directly to the copy object and map them to the actual object when the process is over (either immediately after process termination or when scheduled by the system) and without subsequent user permission. This approach can obtain user permission when an isolated process transition to the running state but may not ask for any further permission after that. Such example proactive schemes can be a more user friendly approach that may cause some unwilling changes to the actual objects (less secure) since the user will not be prompted by all details about the changes that isolated processes may apply to different objects in the system.

In another example, reactive permission schemes can be used in which systems ask for user permission reactively based upon any changes (write operation) that are to be applied to the copy object (and/or when the changes on the copy object are mapped to the actual object). Such reactive permission schemes can be more secure than proactive approaches since the permissions are obtained per change (change to the copy object and/or changes that are going to be mapped to the actual object). These reactive approaches, however, may be less user-friendly, especially for processes that make several changes to multiple objects when in the running state, since each change can require additional user input, which can cause disturbances to the normal operation of the system.

Permission schemes, such as proactive and/or reactive permission schemes, may additionally and/or alternatively shift obtaining user permission to mapping time (e.g., once at the beginning of the mapping time under proactive permission schemes, for each individual change to be mapped with reactive permission schemes), which may be less disruptive to users. However, postponing such modifications until mapping phase may not always be possible. For example, if two processes (one isolated and the other not) are in the running state at the same time and need to make changes to the same object simultaneously (even though one of them is making changes to the copy version), it can be good practice to ensure consistency between the two processes and the objects they are working with. For instance, if consistency is not maintained for two different versions (actual and copy) as changes are made across the two versions, it may be impossible to merge such changes at a later time (e.g., some changes may be incompatible across the objects used by the isolated and not isolated processes). Consistency can be maintained by mapping changes, for example, in manners similar to those used by versioning systems, such as SubVersion systems. For instance, when two processes (isolated and not isolated) are working on two different versions of an object (copy and actual) and none of them is performing write operation on the object, there may be no need for user permission and/or mapping during the running phase. However, it may be necessary to map changes to both versions of the object when one changes. Concurrent modification controls can be used to maintain consistency across different processes using different versions of an object.

In addition to using different permission schemes based on the type of isolated process and/or object that is being used, different isolated memory spaces can be used to store copy versions (e.g., objects) and the changes to be applied thereto. When in the running state, a process (control segment) and its corresponding object (actual or copy) are moved from disk to the main memory (and some data blocks to the cache). Isolated memory space that is used for the process may be in any of a variety of locations, such as on the disk (example non-volatile memory), main memory (example volatile memory), and/or cache (example volatile memory). The isolated memory space that is used can be selected based on a variety of factors, such as the state of the process and/or mapping phases. For example, if no mapping is required (e.g., based on the proactive/reactive approaches and other settings discussed earlier) until the process is terminated or until a specific time (e.g., mapping is periodically performed every 24 hours or when system reboots), the copy version and the changes can be stored on an isolated space on the disk (similar to actual objects). In another example, for approaches that use multiple mappings (e.g., process terminates and starts multiple times a day or setting is reactive or the concurrent write operation occurs), it may be inefficient to store the object on the disk and, instead, an isolated memory space may be created on the main memory. Such an example use of an isolated space in main memory can help reduce, for example, the mapping overhead especially if mapping happens frequently. For instance, the actual and copy objects can both be in the main memory and isolated main memory, respectively, and immediate mappings (those necessary for version control and object consistency) can be performed accordingly and the final mapping on the object (after process termination) is performed on the disk.

The use of an isolated space in main memory can be limited based on any of a variety of factors. For instance, the isolated memory space can keep track of all changes applied to copy objects and, therefore, may increase in size over time as the number of objects not mapped to the actual memory space increases. Moreover, if mapping is postponed to the process termination of multiple isolated processes (and/or children of an isolated process and/or other isolated processes) the number of changes and their sequence may become complex and hard to manage simultaneously. Thus, the system may set limits on the use of the isolated space in main memory, which can force some changes to be mapped before, for example, process termination. Any of a variety of limits can be used, such as upper limits on the number of objects being stored in the isolated memory space, number of isolated processes working on the same copy object, number of changes applied to an object while in the isolated memory space (before mapping), maximum times objects can be left unmapped inside the isolated memory space, and/or any combination thereof.

Figure 1B:
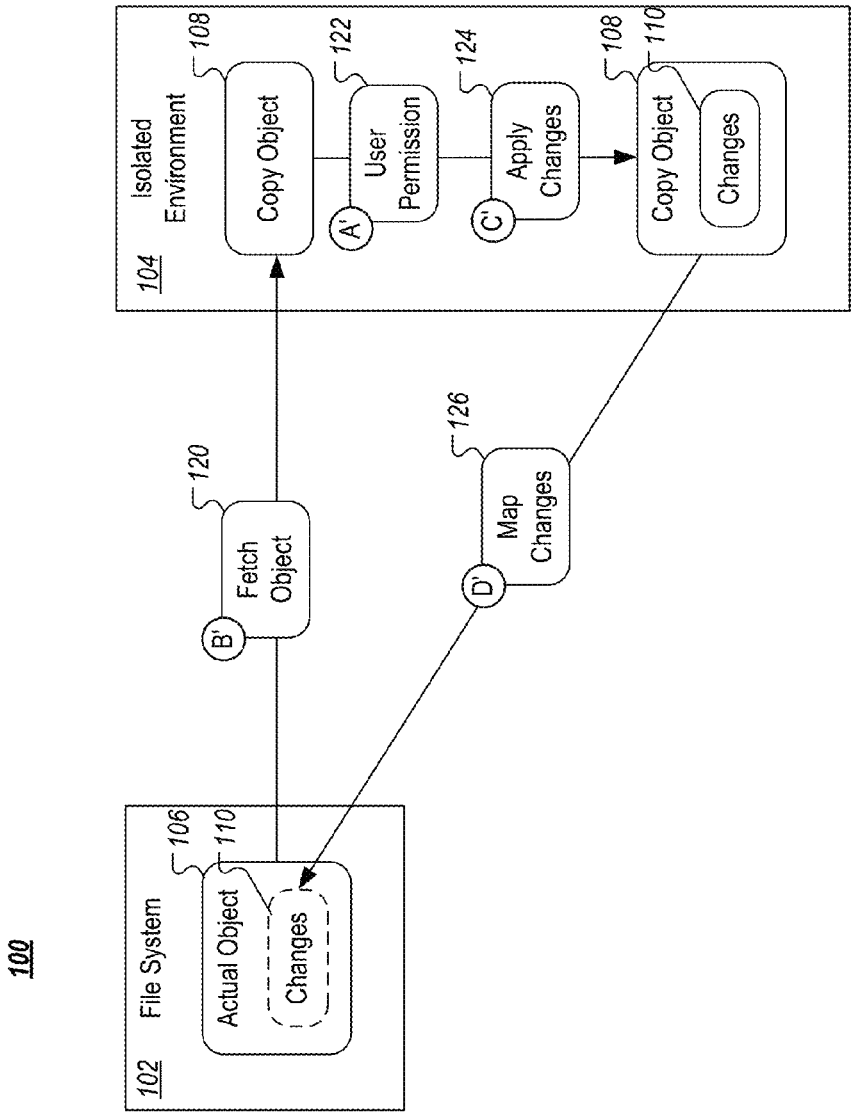

FIGS. 1A-B are a conceptual diagram of an example computer system 100 for applying and mapping process changes according to various permission schemes. The example computer system 100 can be any of a variety of computing environments, including individual computing devices (e.g., laptop computers, desktop computers, mobile computing devices, wearable computing device, computer server) and/or networked groups of computing devices (e.g., server system, cloud computing system, client-server system). The computer system 100 includes an example file system 102 that stores files for processes, such as actual objects, that are used to execute the processes on the computer system 100, and an example isolated environment 104 that includes one or more isolated spaces in volatile (e.g., RAM, cache) and/or non-volatile memory (e.g., storage device) that are used to execute copies of the processes in isolation on the computer system 100.

FIGS. 1A-B depict an example actual object 106 for a process that, as part of being run in isolation, is copied to create a corresponding example copy object 108 in the isolated environment 104 to which one or more changes 110 are applied and then mapped back to the actual object 106. FIG. 1A depicts using an example proactive permission scheme to apply the changes 110 to the copy object and to map the changes 110 back to the actual object 106. FIG. 1B depicts using an example reactive permission scheme to apply the changes 110 to the copy object and to map the changes 110 back to the actual object 106. The computer system 100 can select between the example permission schemes (e.g., proactive, reactive, reactive batch, other permission schemes) based on any of a factors, such as characteristics of the actual object 106/copy object 108/ corresponding process (e.g., likelihood of making system changes, likelihood of making changes to user file, history of making system changes, history of making changes to user files) and/or risk assessment for the actual object 106/copy object 108/corresponding process. For example, the example proactive permission scheme (FIG. 1A) can be selected for a process that is to be run in isolation and has a history of making no system changes and few user-space changes (e.g., change stored content files). In another example, the example reactive permission scheme (FIG. 1B) can be selected for a process that is to be run in isolation and has a history of making several system changes (e.g., toggle wireless transmission settings, activate/deactivate web camera).

A variety of other factors can additionally and/or alternatively be used by the computer system 100 to select between the example permission schemes. For example, system performance (e.g., memory utilization, CPU utilization) at the time that a process is being instantiated at run or execution time can be another factor. For instance, if system performance is low—the memory and CPU are busy with multiple processes (high memory and CPU utilization) at a running state and multiple objects stored in an isolated space are not mapped yet—a proactive approach can be selected based on proactive approaches using fewer system resources for context switching and user permissions. On the other hand, when the memory utilization and CPU utilization is low (system performance is high) with only a few process are in a running state and few objects in an isolation space, a reactive approach can be selected to provide a greater level of security for the system without drastically impacting the overall system performance.

In another example, a trust score can be assigned to processes and used as a factor by the computer system 100 to select between permission schemes. For instance, trust scores can be determined for processes based on information regarding previous operation of the processes, such as the previous running times of processes when operating under a reactive approach and/or historical information for files associated with processes, such as how many times files required mappings and/or a number/type of files/objects a process needed to change during previous operation. A trust score for a process can initially be set to a low number that indicates a low level of trust for the process and each time the process runs, for example, in a reactive mode and a user allows it to map its changes, the trust score can be increased. After multiple times running in a reactive mode and obtaining user permission, which can cause the trust score to increase, the process can be permitted to be included in grouping (batching) mechanism mode as discussed above. However, other events and/or actions may decrease a trust score for a process, such as a user declining permission requests for a process (e.g., declining at least a threshold number of permission requests, declining a specific number of iterations of permission requests), updates/upgrades/patches being applied to processes (e.g., updates/upgrades/patches may introduce unknown bugs or vulnerabilities that will cause a trust score to be lowered), and/or updates/upgrades/patches being applied to the operating system (e.g., operating system updates/upgrades/patches may lower all trust scores based on potential effects of new features/settings/procedures/etc. defined in the new operating system version on processes running on the operating system).

Processes that have at least a first threshold trust score (indicating a moderate amount of trust) can be permitted to be included in grouping (batching) mechanisms (processes with less the first threshold trust score—low level of trust—may not be permitted to operate in a group/batching mechanism). Additionally, processes that have at least a second threshold score (greater than the first threshold score) that indicates a high level of trust can be permitted to operate under a proactive approach. For instance, after running multiple times in a grouping/batching approach and receiving user permission to apply changes, which can increase the trust score for a process, the process can have a trust score that is greater than or equal to the second threshold trust score so as to permit it to operate in a proactive mode. Trust scores can be determined based on a variety of additional factors, such as the example characteristics and/or risk assessment for the of the actual object 106/copy object 108/corresponding process described above.

Referring to FIG. 1A, in response to determining that a proactive permission scheme should be used for the copy object 108, the computer system 100 can request user permission, as indicated by step A (112), before fetching a copy of the actual object 106 and running it in the isolated environment 104, as indicated by step B (114). For example, in response to a user selecting an application associated with the actual object 106 and the computer system 100 determining that the process should be run in isolation using a proactive permission scheme, the computer system 100 can output (e.g., display, audibly output, haptic prompt) a prompt for a user to provide permission for the application to apply and/or map any changes to the file system 102 that are made while the application is running. In response to the user providing permission for such changes (e.g., selecting a button, providing verbal permission, providing particular movement-based input), the computer system 100 can proceed to fetch a copy of the actual object 106 to instantiate the copy object 108 in the isolated environment.

With the permission having been granted under the example proactive permission scheme, the computer system 100 can proceed to apply the changes 110 to the copy object 108 within the isolated environment 104, as indicated by step C (116), and to map those changes from the isolated environment 104 to the actual object 106 in the (non-isolated) file system 102, as indicated by step D (118).

Referring to FIG. 1B, in response to determining that a reactive permission scheme should be used for the copy object 108, the computer system 100 can fetch a copy of the actual object 106 and running it in the isolated environment 104 without first obtaining user permission for changes to be applied/mapped to the copy object, as indicated by step B' (120). Step B' can be similar to step B (114). For example, in response to a user selecting an application associated with the actual object 106 and the computer system 100 determining that the process should be run in isolation using a reactive permission scheme, the computer system 100 can proceed to fetch a copy of the actual object 106 to instantiate the copy object 108 in the isolated environment without first obtaining user permission.

However, in response to a change being detected that is to be applied to and/or for the copy object 108, the computer system 100 can request user permission to apply the change, as indicated by step A' (122). Step A' can be similar to step A (112), but can be performed in response to each change that is detected for the copy object 108 while it is being run in the isolated environment 104. For example, the computer system 100 can output (e.g., display, audibly output, haptic prompt) a prompt for a user to provide permission for the copy object 108 to make each change, such as turning the web camera on/off and/or communicating with a remote server system, that is requested by the copy object 108 while it is running in the isolated environment. In response to the user providing permission for such changes (e.g., selecting a button, providing verbal permission, providing particular movement-based input), the computer system 100 can proceed to apply the changes 110 to the copy object 108 (and/or to other objects/system resources on behalf of the copy object 108), as indicated by step C' (124). Step C' can be similar to step C (116), but the performance of step C' may be conditioned on the user permission being received at step A' (122). The permitted changes 110 that are approved by the user and applied to the copy object 108, can be mapped to the actual object 106, as indicated by step D' (126). Step D' can be similar to step D (118). In some implementations, a reactive permission scheme may alternatively/additionally obtain user permissions for each change at the mapping phase (step D').

Figure 2:
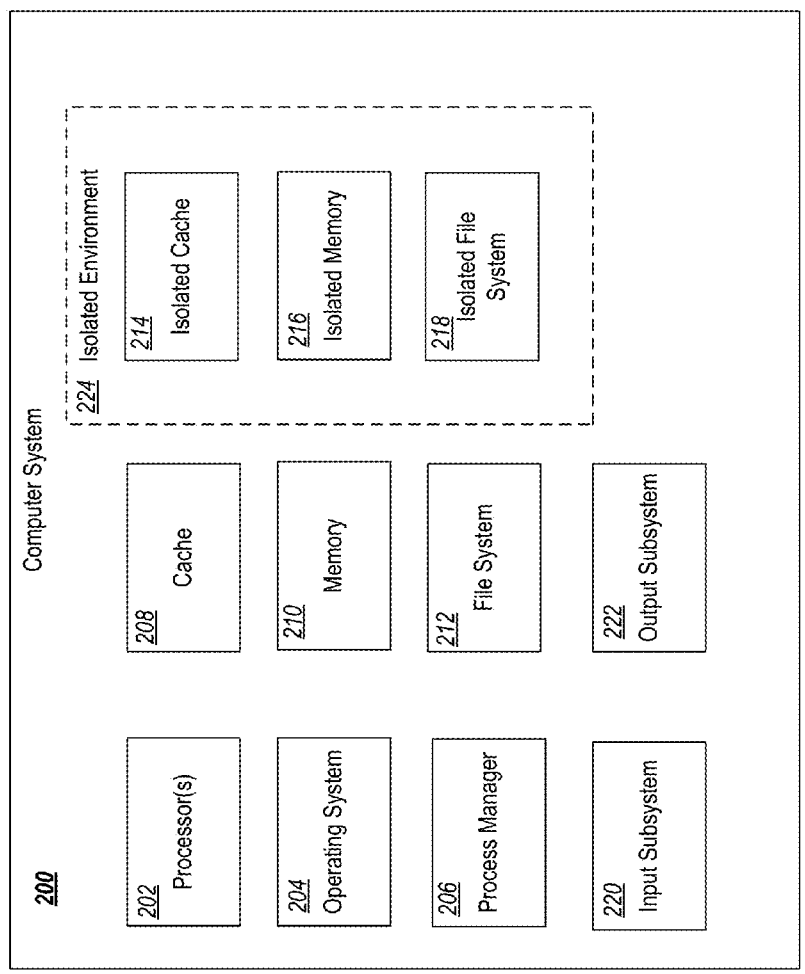
FIG. 2 depicts an example computer system for mapping changes to processes.

FIG. 2 depicts an example computer system 200 for mapping changes to processes. The example system 200 can be similar to the system 100 described above with regard to FIGS. 1A-B. For example, the computer system 200 can perform steps A-D and/or A'-D' based on, for example, characteristics of processes to be run in isolation. The computer system 200 can be any of a variety of appropriate computer systems, such as individual computing devices (e.g., laptops, desktop computers, mobile computing devices, computer server) and/or networked computing devices (e.g., server system, cloud-based computer system, client-server system).

The computer system 200 includes one or more processors 202 and an operating system 204 for the computer system 200 that is run using the processors 202 to provide a computing environment on the computer system 200. The computer system 200 can include an actual cache 208, memory 210, and file system 212 that are in a native namespace and used by the processors 202 and the operating system 204 to execute processes that are not in isolation. The computer system 200 also includes an isolated environment 224 (similar to the isolated environment 104) that includes an isolated cache 214, isolated memory 216, and an isolated file system 218 that can be restricted from the namespace (and other system resources/settings) for the non-isolated space used by processors 202 and/or operating system 204.

The example fetching steps described above with regard to steps B and B' can be performed by creating copies of actual objects, which may be stored across one or more of the cache 208, the memory 210, and the file system 212, and instantiating the copies in the isolated environment 224 (e.g., across one or more of the isolated cache 214, the isolated memory 216, and the isolated file system 218). Applying changes a control object, as described above with regard to steps C and C', can be performed within the isolated environment 224, for example, by applying changes from the isolated cache 214 to data/objects (e.g., the control object, other objects, isolated environment settings) in the isolated memory 216 and/or to files (e.g., the control object, other objects, isolated environment settings) stored in the isolated file system 218.

The computer system 200 includes a process manager 206 that is programmed to manage a variety of details regarding the execution of isolated processes, such as whether or not processes are to be executed in the isolated environment 224, which of a plurality of permission schemes (e.g., proactive permission scheme, reactive permission scheme, combination/hybrid of proactive and reactive permission schemes (e.g., batching/grouping reactive permission scheme), other permission schemes) are to be used for processes executed in the isolation environment 224, enforcing the selected permission scheme (e.g., requesting user permission, blocking various operations (fetching, applying changes, mapping) until appropriate user permissions are obtained), identifying situations when version control may be appropriate (e.g., actual and copy objects being executed simultaneously for same process), implementing versioning controls when appropriate (e.g., mapping changes between actual and copy objects being executed concurrently), and/or mapping changes from the isolated environment 224 to the non-isolated environment (cache 208, memory 210, file system 212). The process manager 206 can be implemented in any of a variety of ways, such as through software (e.g., applications, operating system process), hardware (e.g., ASIC), firmware, or any combination thereof.

The process manager 206 can use an input subsystem 220 and output subsystem 222 that are part of the computer system 200 to obtain user permissions for various actions (e.g., proactive permissions, reactive permissions). The input subsystem 220 can include any of a variety of components through which a user can provide input, such as touchscreens, keyboards, physical buttons, cameras, microphones, accelerometers, gyroscopes, magnetometers, and/or other appropriate input devices. The output subsystem 222 can include any of a variety of components through which a user can provide output, such as displays, speakers, haptic feedback devices, and/or other appropriate output devices.

FIGS. 3A-D are flowcharts of an example technique 300 for assessing risks posed by computer processes. The example technique 300 can be performed by any of a variety of appropriate computer systems and/or computing devices, such as the computer system 100 and/or the computer system 200.

Figure 3A:
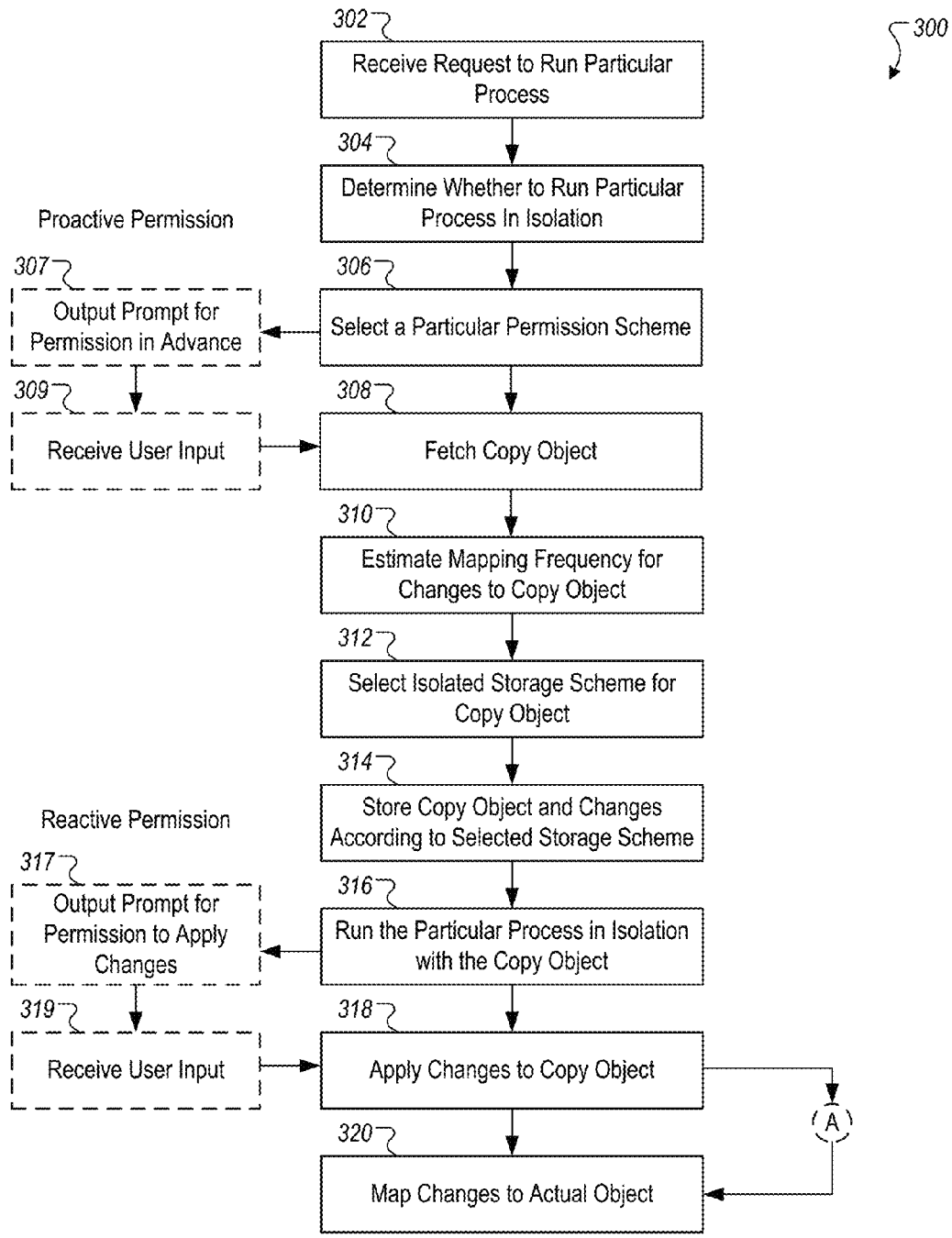
FIGS. 3A-D are flowcharts of an example technique for assessing risks posed by computer processes.

Referring to FIG. 3A, a request to run a particular process is received (302). For example, a user can select an application to run on the computer system 200 through the user subsystem 220. In response to receiving the request, a determination can be made as to whether to run the particular process in isolation (304). For example, the program manager 206 can determine, based on any of a variety of factors (e.g., previous behavior of process when executed on computer system 200, process having been flagged, certification/authentication of process being from trusted source), whether the selected process poses a potential risk to the computer system 200 and can determine whether the process should be run in isolation (e.g., in the isolation environment 224). In response to determining that the particular process should run in isolation, a particular permission scheme can be selected from among a plurality of permission schemes (306). For example, the process manager 206 can determine whether a proactive, reactive, or other permission scheme should be used to apply and map changes from the isolated process back to the actual process. Such selection of a permission scheme can be based on a variety of factors, such as characteristics of the particular process and/or copy objects being run in the isolated environment 224.

A variety of other factors can additionally and/or alternatively be used by the process manager 206 to select a permission scheme for a process. For example, the historical process management of a process can be used as parameter factor in selecting a permission scheme. For instance, historical process management can include performance efficiency (e.g., number of mappings, number of context switches, number of system files and user files, its impact on the memory and CPU usage, etc.) of a process as described above. Trust scores, which may be based, at least in part, on historical process management, can additionally be used as factors for selecting permission schemes. The process manager 206 may also consider system factors at the moment the process is called to be run, such as the system performance (e.g., memory and/or CPU usage) at that time, any security alert/log generated recently in the system (may increase the risk probability), and/or other appropriate system performance factors. For example, if an anti-virus process has recently prompted detection of some malicious files/processes, the system security level can increase to "very high" and, consequently, the isolation and mapping mechanisms can also be very restricted.

In implementations in which a proactive permission scheme is determined to be appropriate, a user can be prompted to provide permission to apply/map changes in advance of the changes being made (307) and user input providing the permission can be received (309). Such permission can be received before a copy object for the particular process is fetched (308). In implementations in which a proactive permission scheme is not used, the copy object can be fetched without first obtaining user permission (308).

A mapping frequency for changes to the copy object can be estimated (310) and used to select an isolated storage scheme to use for the copy object (312). For example, the process manger 206 can determine whether a copy object is likely to map changes more than a threshold number of times (e.g., more than 1, 2, 5, 10) within a threshold time period (e.g., 1 hour, 24 hours, 1 week), based on the estimate, can determine whether to store the copy object and changes thereto, for example, in non-volatile memory (example storage scheme) or volatile memory (another example storage scheme). The copy objects and changes thereto can be stored according to the selected storage scheme (314). For example, in a storage scheme that includes storing the copy object and changes thereto in volatile memory, the process manager 206 can store the copy object and its changes in the isolated cache 214 and/or the isolate memory 216.

The particular process can be run in isolation with the copy object (316) and, when changes are generated, they can be applied to the copy object (318). In implementations in which a reactive permission scheme is selected, the application of the changes can be contingent upon a user being prompted for permission to apply the changes (317) and the user providing the requested permission (319). For example, the process manger 206 can prompt the user for permission through the output subsystem 222 and receive user permission through the input subsystem 220.

Changes can be mapped to the actual object (320). In some implementations, changes may be mapped without further user input, such as when a proactive permission scheme is being used. In some implementations, the timing and/or permissions for mapping such changes to the actual object can be based on additional factors, such as those outline for sub-techniques 330, 350, and 370 in FIGS. 3B-D, which can be performed in combination with the technique 300.

Figure 3B:
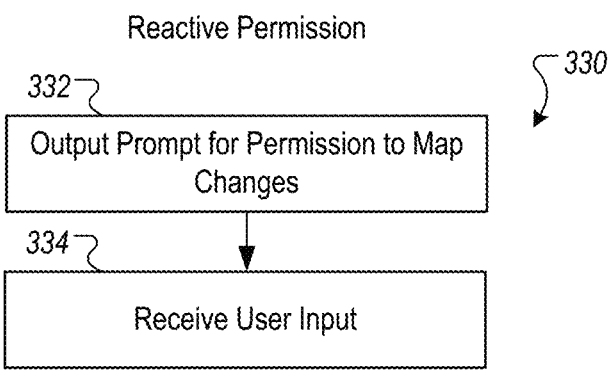

Referring to FIG. 3B, a sub-technique 330 is depicted in which user permission to map the changes is prompted (332) and received (334). For example, the sub-technique can be performed as part of a reactive permission scheme.

Figure 3C:
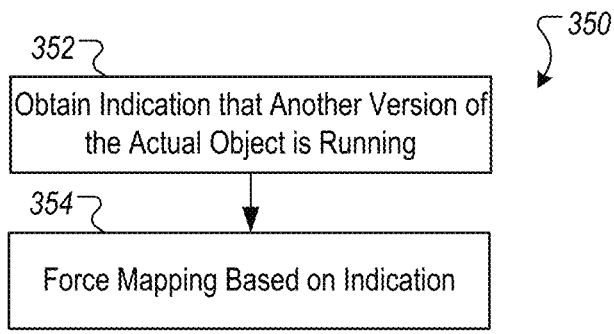

Referring to FIG. 3C, sub-technique 350 is depicted in which an indication is obtained that there is another version of the copy object (e.g., concurrently running and corresponding actual object) that is running (352). In response to changes being detected in the copy object, those changes can be mapped to the other corresponding object so as to avoid irreconcilable inconsistencies between the two objects (354). The sub-technique 350 can be performed in combination with the sub-technique 330, when appropriate, before mapping the changes to the corresponding other object (320).

Figure 3D:
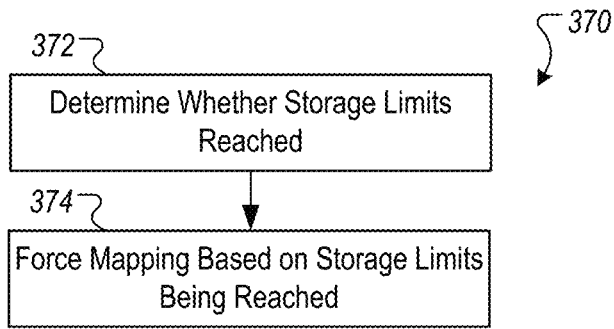

Referring to FIG. 3D, sub-technique 370 is depicted in which a determination is made as to whether storage limits for storing the copy object and changes thereto in an isolated space (e.g., volatile memory in the isolated environment 224, non-volatile memory in the isolated environment 224) has been reached (372). For example, a variety of limits can be set, for example, on storage in an isolated portion of volatile memory, such as a limit on a number of object and/or changes that can be stored, a limit on a number of isolated processes that can apply to a particular copy object, a limit on a number of changes that can be applied to the copy object while in the isolated space in volatile memory, a limit on a length of time that the copy object is permitted to be stored in the isolated space in volatile memory before being mapped to the actual object, or any combination thereof. In response to one or more of the storage limits being reached, the copy object and/or changes thereto can be mapped (374). The example sub-technique 370 can be performed in combination with the sub-techniques 330 and/or 350.

Figure 4:
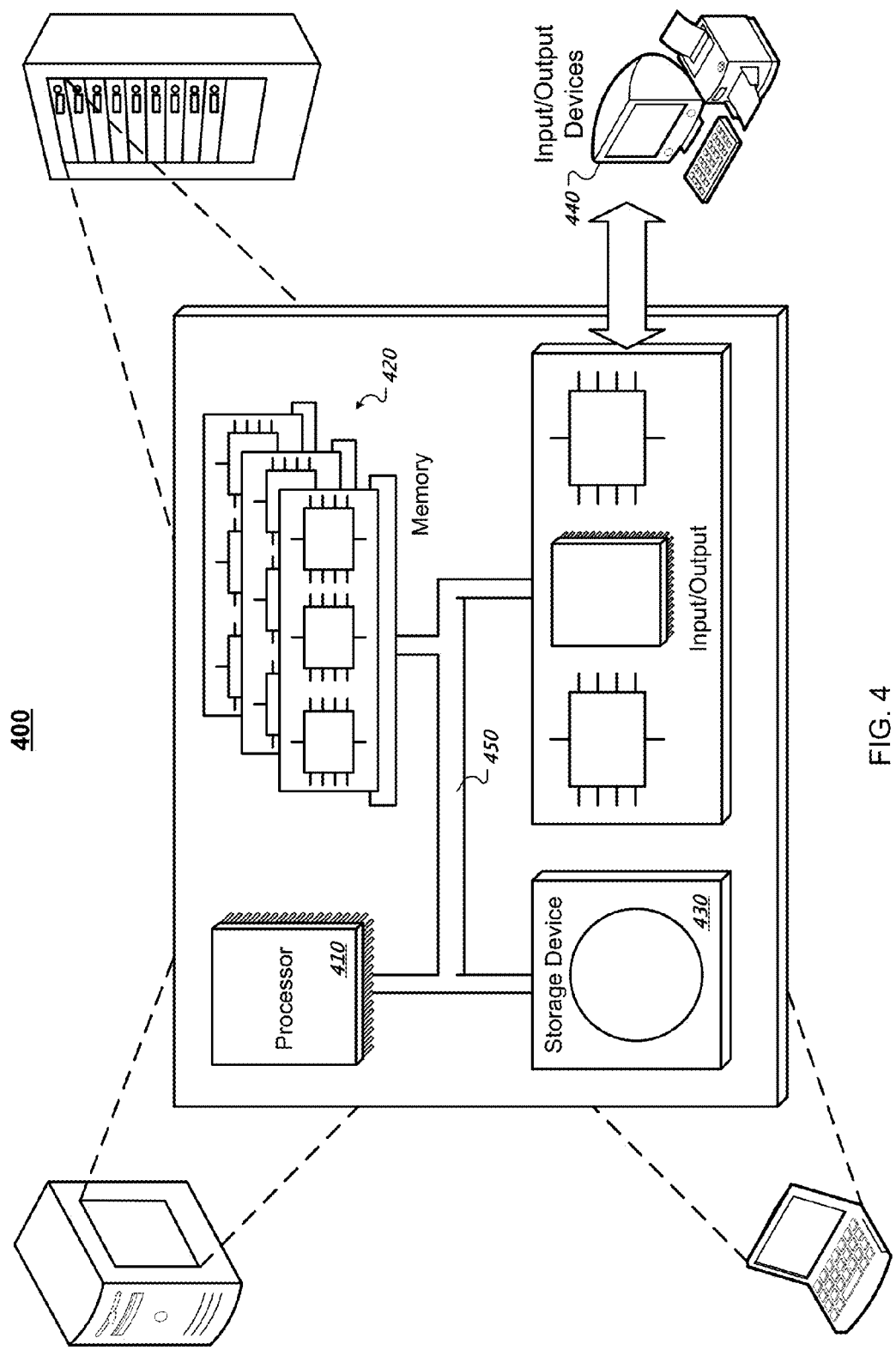
FIG. 4 illustrates a schematic diagram of an exemplary generic computer system.

FIG. 4 illustrates a schematic diagram of an exemplary generic computer system. The system 400 can be used for the operations described in association with the processes 300 according to some implementations. The system 400 may be included in the system 500.

The system 400 includes a processor 410, a memory 420, a storage device 430, and an input/output device 440. Each of the components 410, 420, 430, and 420 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method comprising:
   identifying one or more characteristics of a particular process that is to be run in an isolated environment and that is characterized as possibly malware;
   before the particular process is run in the isolated environment, selecting, by a process manager running on a computer system and based on one or more of the characteristics of the particular process, a particular permission scheme from among (i) a first permission scheme in which a user is prompted for permission a single time in advance of a first change being made to a copy object by the particular process and is not subsequently prompted for permission for any other change being made to the copy object by the particular process after that, and (ii) a second permission scheme in which the user is prompted for permission in response to each change being made to the copy object by the particular process;
   obtaining, by the process manager and according to the particular permission scheme, an isolated copy object that (a) is in the isolated environment, and (b) corresponds to an actual object that is not in the isolated environment;
   after selecting the particular permission scheme, running the particular process in the isolated environment on the computer system, thereby generating one or more changes to the isolated copy object; and
   copying, by the process manager and according to the particular permission scheme, one or more of the changes to the isolated copy object to the actual object that is not in the isolated environment.

2. The computer-implemented method of claim 1, comprising:
   outputting, by the computer system and before obtaining the isolated copy object, information to prompt the user to provide permission for changes to the isolated copy object in advance of any changes being made; and
   receiving, at the computer system and before obtaining the isolated copy object, user input comprising permission for changes to the isolated copy object,
   wherein the copy object is obtained in response to the user input being received.

3. The computer-implemented method of claim 1, comprising:
   outputting, by the computer system after obtaining the isolated copy object and before applying the one or more changes to the copy object, information to prompt the user to provide permission for each of the one or more changes to the isolated copy object; and receiving, at the computer system and before applying the one or more changes to the isolated copy object, user input comprising permission for each of the one or more changes to the isolated copy object, wherein the one or more changes are applied to the isolated copy object in response to the user input being received.

4. The computer-implemented method of claim 1, comprising:

receiving, at the process manager, a request to run the particular process on the computer system; and determining, by the process manager, that the particular process is characterized as possibly malware.

5. The method of claim 1, wherein one or more of the characteristics of the particular process that is characterized as possibly malware comprise a trust score associated with the particular process.

6. The method of claim 1, wherein one or more of the characteristics of the particular process that is characterized as possibly malware comprise a quantity of changes to objects that the particular process previously required during a prior execution.

7. A non-transitory computer-readable medium having stored thereon instructions, which, when executed by one or more computers, cause the one or more computers to perform operations comprising:

identifying one or more characteristics of a particular process that is to be run in an isolated environment and that is characterized as possibly malware;

before the particular process is run in the isolated environment, selecting, by a process manager running on a computer system and based on one or more of the characteristics of the particular process, a particular permission scheme from among (i) a first permission scheme in which a user is prompted for permission a single time in advance of a first change being made to a copy object by the particular process and is not subsequently prompted for permission for any other change being made to the copy object by the particular process after that, and (ii) a second permission scheme in which the user is prompted for permission in response to each change being made to the copy object by the particular process;

obtaining, by the process manager and according to the particular permission scheme, an isolated copy object that (a) is in the isolated environment, and (b) corresponds to an actual object that is not in the isolated environment;

after selecting the particular permission scheme, running the particular process in the isolated environment on the computer system, thereby generating one or more changes to the isolated copy object; and copying, by the process manager and according to the particular permission scheme, one or more of the changes to the isolated copy object to the actual object that is not in the isolated environment.

8. The medium of claim 7, wherein the operations comprise:

outputting, by the computer system and before obtaining the isolated copy object, information to prompt the user to provide permission for changes to the isolated copy object in advance of any changes being made; and receiving, at the computer system and before obtaining the isolated copy object, user input comprising permission for changes to the isolated copy object, wherein the copy object is obtained in response to the user input being received.

9. The medium of claim 7, wherein the operations comprise:

outputting, by the computer system after obtaining the isolated copy object and before applying the one or more changes to the copy object, information to prompt the user to provide permission for each of the one or more changes to the isolated copy object; and receiving, at the computer system and before applying the one or more changes to the isolated copy object, user input comprising permission for each of the one or more changes to the isolated copy object, wherein the one or more changes are applied to the isolated copy object in response to the user input being received.

10. The medium of claim 7, wherein the operations comprise:

receiving, at the process manager, a request to run the particular process on the computer system; and determining, by the process manager, that the particular process is characterized as possibly malware.

11. The medium of claim 7, wherein one or more of the characteristics of the particular process that is characterized as possibly malware comprise a trust score associated with the particular process.

12. The medium of claim 7, wherein one or more of the characteristics of the particular process that is characterized as possibly malware comprise a quantity of changes to objects that the particular process previously required during a prior execution.

13. A system comprising:

one or more processors and one or more computer storage media storing instructions that are operable, when executed by the one or more processors, to cause the one or more processors to perform operations comprising:

identifying one or more characteristics of a particular process that is to be run in an isolated environment and that is characterized as possibly malware;

before the particular process is run in the isolated environment, selecting, by a process manager running on a computer system and based on one or more of the characteristics of the particular process, a particular permission scheme from among (i) a first permission scheme in which a user is prompted for permission a single time in advance of a first change being made to a copy object by the particular process and is not subsequently prompted for permission for any other change being made to the copy object by the particular process after, and (ii) a second permission scheme in which the user is prompted for permission in response to each change being made to the copy object by the particular process;

obtaining, by the process manager and according to the particular permission scheme, an isolated copy object that (a) is in the isolated environment, and (b) corresponds to an actual object that is not in the isolated environment;

after selecting the particular permission scheme, running the particular process in the isolated environment on the computer system, thereby generating one or more changes to the isolated copy object; and copying, by the process manager and according to the particular permission scheme, one or more of the changes to the isolated copy object to the actual object that is not in the isolated environment.

14. The system of claim 13, wherein the operations comprise:
  outputting, by the computer system and before obtaining the isolated copy object, information to prompt the user to provide permission for changes to the isolated copy object in advance of any changes being made; and
  receiving, at the computer system and before obtaining the isolated copy object, user input comprising permission for changes to the isolated copy object,
  wherein the copy object is obtained in response to the user input being received.

15. The system of claim 13, wherein the operations comprise:
  outputting, by the computer system after obtaining the isolated copy object and before applying the one or more changes to the copy object, information to prompt the user to provide permission for each of the one or more changes to the isolated copy object; and
  receiving, at the computer system and before applying the one or more changes to the isolated copy object, user input comprising permission for each of the one or more changes to the isolated copy object,
  wherein the one or more changes are applied to the isolated copy object in response to the user input being received.

16. The system of claim 13, wherein the operations comprise:
  receiving, at the process manager, a request to run the particular process on the computer system; and
  determining, by the process manager, that the particular process is characterized as possibly malware.

17. The system of claim 13, wherein one or more of the characteristics of the particular process that is characterized as possibly malware comprise a trust score associated with the particular process.

18. The system of claim 13, wherein one or more of the characteristics of the particular process that is characterized as possibly malware comprise a quantity of changes to objects that the particular process previously required during a prior execution.

* * * * *